US011228738B2

(12) United States Patent
Vettese et al.

(10) Patent No.: US 11,228,738 B2
(45) Date of Patent: Jan. 18, 2022

(54) HEAD-MOUNTABLE AUGMENTED VISION SYSTEM FOR DISPLAYING THERMAL IMAGES

(71) Applicant: DARIX SÀRL, Renens (CH)

(72) Inventors: Loris Vettese, La Chaux-de-Fonds (CH); Jonathan Price, Grolley (CH); Adrien Birbaumer, Lausanne (CH); Martinus Bosch, Lausanne (CH)

(73) Assignee: Darix Sàrl, Renens (CH)

( * ) Notice: Subject to any disclaimer, the term of this patent is extended or adjusted under 35 U.S.C. 154(b) by 0 days.

(21) Appl. No.: 16/762,667

(22) PCT Filed: Jan. 24, 2019

(86) PCT No.: PCT/IB2019/050592
§ 371 (c)(1),
(2) Date: May 8, 2020

(87) PCT Pub. No.: WO2019/145886
PCT Pub. Date: Aug. 1, 2019

(65) Prior Publication Data
US 2020/0366872 A1    Nov. 19, 2020

(30) Foreign Application Priority Data

Jan. 24, 2018    (CH) .................................... 00081/18

(51) Int. Cl.
*H04N 7/18*    (2006.01)
*H04N 5/232*    (2006.01)
(Continued)

(52) U.S. Cl.
CPC ............. *H04N 7/185* (2013.01); *A42B 3/042* (2013.01); *A62B 18/08* (2013.01);
(Continued)

(58) Field of Classification Search
CPC .. H04N 7/185; H04N 5/23299; H04N 5/2253; A42B 3/042; A62B 18/08;
(Continued)

(56) References Cited

U.S. PATENT DOCUMENTS

| 6,369,952 B1 * | 4/2002 | Rallison | G02B 27/017 |
| | | | 359/630 |
| 7,460,304 B1 * | 12/2008 | Epstein | A62B 18/082 |
| | | | 2/6.3 |

(Continued)

FOREIGN PATENT DOCUMENTS

| CN | 202255628 U | 5/2012 |
| WO | 2019120525 A1 | 6/2019 |

OTHER PUBLICATIONS

European Patent Office, International Search Report issued in corresponding Application No. PCT/B2019/050592, dated May 6, 2019.

*Primary Examiner* — Thai Q Tran
*Assistant Examiner* — Nienru Yang
(74) *Attorney, Agent, or Firm* — Stites & Harbison, PLLC; David W. Nagle, Jr.; Gary N. Stewart

(57) ABSTRACT

The invention concerns an augmented vision system (1) comprising: a displaying device (3) comprising: a fixing element (31) for coupling the displaying device (3) to a head-mountable component (90) configured to be positioned in front of a 5 face (102) of a user (100), and a display body (32) being coupled to said fixing element (31) by means of a pivoting link (321, 322, 323) providing a rotation of the display body with respect to the fixing element around a rotational axis (38); the display body (32) comprising 10 a display (33) configured to display thermal data and/or images provided by a thermal sensing device (2); and a first surface portion (325) configured to enter in contact with a forehead of a user, when said head-mountable component
(Continued)

(90) is positioned in front of the face of the user, so as to rotate the display 15 body (32) to a predefined angular positioning (381) around the rotational axis (38).

21 Claims, 6 Drawing Sheets

(51) Int. Cl.
*A42B 3/04* (2006.01)
*A62B 18/08* (2006.01)
*G02B 27/01* (2006.01)
*H04N 5/225* (2006.01)
*A62B 18/04* (2006.01)

(52) U.S. Cl.
CPC ..... *G02B 27/0172* (2013.01); *G02B 27/0176* (2013.01); *H04N 5/2253* (2013.01); *H04N 5/23299* (2018.08); *A62B 18/04* (2013.01); *G02B 2027/0138* (2013.01); *G02B 2027/0141* (2013.01); *G02B 2027/0156* (2013.01)

(58) Field of Classification Search
CPC ............... A62B 18/04; G02B 27/0172; G02B 27/0176; G02B 2027/0138; G02B 2027/0141; G02B 2027/0156
USPC .......................................................... 348/165
See application file for complete search history.

(56) References Cited

U.S. PATENT DOCUMENTS

| | | | |
|---|---|---|---|
| 9,094,677 B1* | 7/2015 | Mendis | G02B 27/0176 |
| 2003/0058544 A1 | 3/2003 | Bianco et al. | |
| 2008/0186447 A1 | 8/2008 | Davis | |
| 2014/0071294 A1 | 3/2014 | Lavoie | |
| 2015/0302654 A1 | 10/2015 | Arbouzov | |
| 2016/0253561 A1 | 9/2016 | Foley et al. | |
| 2017/0095157 A1* | 4/2017 | Tzvieli | A61B 5/0077 |

* cited by examiner

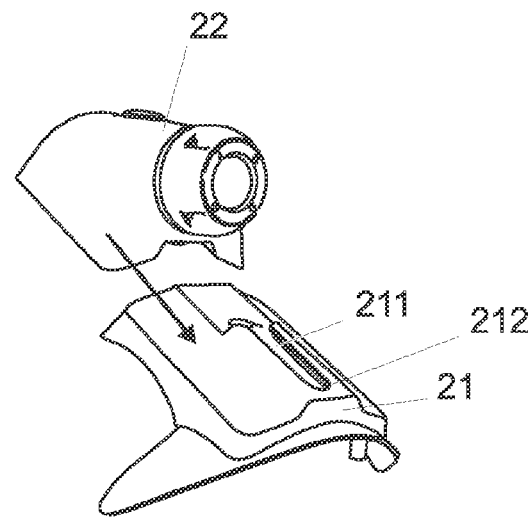
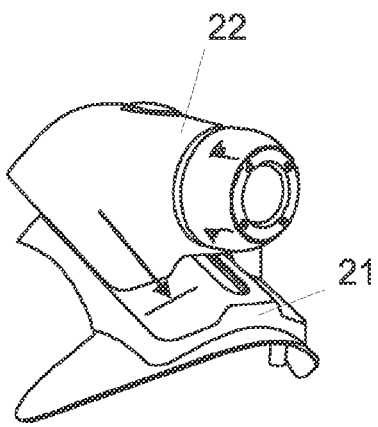
Fig.5a  Fig.5b
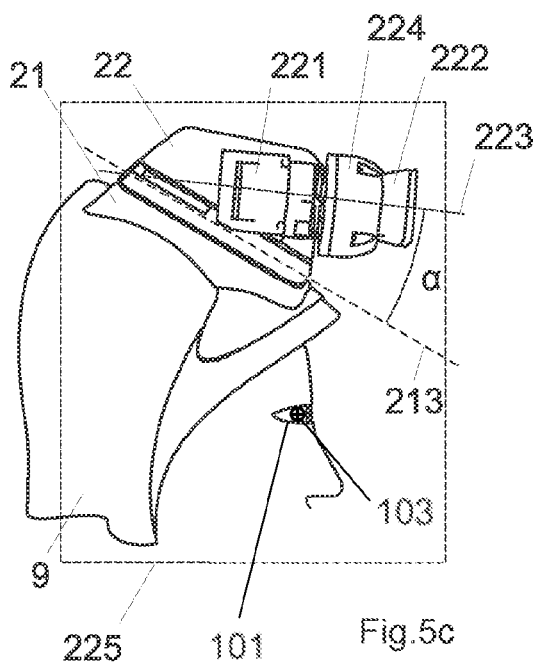
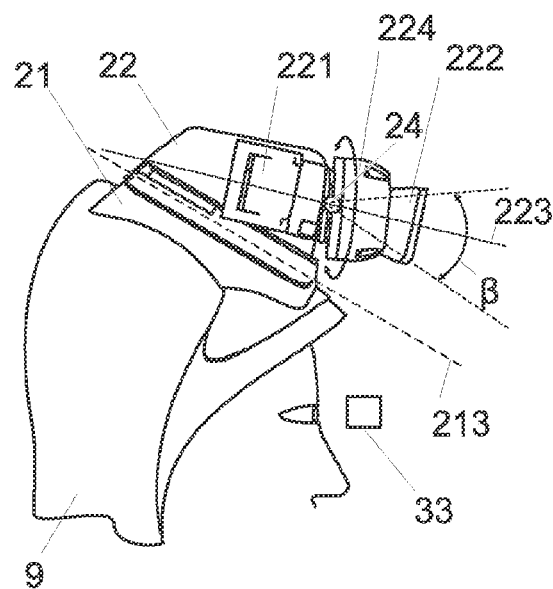
Fig.5c  Fig.5d

HEAD-MOUNTABLE AUGMENTED VISION SYSTEM FOR DISPLAYING THERMAL IMAGES

FIELD OF THE INVENTION

The present invention concerns a head-mountable augmented vision system for displaying thermal data and/or images provided by a thermal sensing device.

In particular, the invention relates to an augmented vision system destined for users, notably specialists, operating in difficult and extreme environments provided with protective head coverings, such as firefighters, policemen/women and a rescuers.

DESCRIPTION OF RELATED ART

There is an increasing interest in augmented vision (AV) systems for supporting users, notably specialists, in executing difficult up to dangerous tasks. Augmented Vision (AV), also called augmented reality (AR), provides a live direct or indirect view of physical, real world environment in which a view of some elements thereof are modified (augmented or even diminished) by computer-generated or extracted real-world sensory input. In particular, AV systems can provide less up to non-visible elements or hint (notably extracted and/or provided by sensors sensing the surrounding world) in the field of view of the user, for sake of efficiency and safety.

Specialists operating in difficult and extreme environments, such as firefighters, policemen/women and rescuers, are slowed downs in their operations by a poor visibility due to particular climatic events, weathers (e.g. fog), darkness as well as due to heavy smoke of fires.

US2014071294 describes a head-mounted sensing system for extreme environments that comprises a transparent display for displaying thermal data. The transparent display is mounted on an external surface of a respiratory mask and it is configured to provide a vertically and horizontally moving of the image pixels for aligning the displayed image with the user's eye.

US2003058544 discloses a system for displaying infrared images reordered by a camera located on a helmet of the user. The images are displayed by means of projectors projecting images on partially transparent lens located in the field-of-view of the user.

US2016253561 describes a fireman's respiratory mask comprising a transparent display for displaying thermal data provided by a camera. The transparent display is mounted inside the visor of the fireman's respiratory mask.

However, known augmented vision (AV) systems suffer of important drawbacks, notably in terms of time-to-enabling (i.e. the time required to worn the mask and to adequately position the displaying images with respect to the eye of the user so as to making the AV system usable), lifetime, and sharing of the AV component with others users and/or others head covering.

The AV systems having displaying means mounted outside mask's protecting visor provide a short time-to-enabling because a fine tuning of displayed images is possible at any time, without to have to remove the mask. However, the manufacturing and the maintenance of these AV systems are more expensive as displaying means are constantly and repeatedly exposed to extremes conditions as unshielded by the mask.

The AV systems having displaying means fixed on internal surfaces of the mask's visor provide a protection against aggressive substances, heats and dusts. However, any adjustment of the positioning of the AV display requires a remove of the mask that negatively affects not only the time-to-enabling of the AV system but also a protection against potential harmful gas provided by air-tight masks.

Moreover, these AV systems require mechanical modifications and adaptations of the mask's frame, rendering difficult up to impossible not only a sharing of the head-mounted AV system between distinct users but also a use of a same AV system with various head-mounting elements.

US2015302654 describes a thermal imaging system mounted on a goggle-type structure. However, google-based AV systems are felt as uncomfortable by users having to wear masks for long intervention due to a prolonged pressure carried out by the google being pushed against the face by the mask. Moreover, such goggle-based AV systems are incompatible with facial-type air-tight masks.

BRIEF SUMMARY OF THE INVENTION

The aim of the invention is to resolve, or at least mitigate, the drawbacks of knows AV systems.

A particular aim of the invention is to provide a cost-effective and rapidly enabling AV system.

Another particular aim of the invention is to provide an AV system being comfortably usable in cooperation with air-tight masks for prolonged interventions.

According to the invention, these aims are achieved by means of the augmented vision system of claim 1 and the method of claim 22. Dependent claims describe particular embodiments of the invention.

The proposed solution provides a repeatable positioning of the display with respect to the eye of the user when the user positions the head-mountable component in front of his face. The repeatable angular positioning provided by a contact between the first surface portion and the forehead of the user, not only provides a fast time-to-enabling, but also provide a better comfortability when used in combination with air-tight masks being strongly pushed against the face. In fact, with respect to other facial regions being used as contact surfaces, e.g. the nose and of the eye's region, the larger surface provided by the forehead as well as his lack of soft tissues and cartilages provide a better repartitions of pressure and smaller sensitivities against prolonged pressures.

In an embodiment, the displaying device is configured to rotate the display body for pushing the first surface portion against the forehead of the user, when the head-mountable component is positioned in the face of the user. This rotation provides retention of the display body at the predefined angular positioning around the rotational axis, notably in case negatively affecting accelerations and/or vibrations of the head-mountable component.

The retaining rotation can be provided by gravity and/or by an elastic force.

In one embodiment, the display device is configured for rotating the display body (with respect to the fixing element) by gravity so as to move the first surface far away from the head-mountable element (on which the display device is fixed), when the head-mountable component is not positioned in the front of the face but positioned and/or hold in a similar position.

Alternatively or complementarily, the displaying device comprises an elastic element providing an elastic force operating between the display body and the fixing element for rotating the display body so as to push the first surface against the forehead of the user, when the head-mountable component is positioned in front of the face of the user.

Alternatively or complementarily, the displaying device can be configured to retain the display body at the predefined angular positioning by means of a second surface portion configured to enter in contact with a portion of the fixing element, when the head-mountable component is positioned in front of the face of the user. Advantageously, the second surface is located at an opposite side with respect to the first surface so as the forces generated by contacts with the forehead and with the fixing element are oriented in opposed either inclined or parallel directions.

Advantageously, for comfortability sake, the displaying body can comprise a resilient portion operating between the first and the second surface for resilient adapting a distance between them, notably the shortest distance between these surfaces. This permit a comfortable use of the proposed solution with airtight masks that require to be strongly pushed against the face of the user, e.g. by means of elastic band, strap or elements destined to cooperate with the nape of the user or coupled to the protecting helmet of the user.

In a preferred embodiment, the displaying device comprises an adjusting mechanism for providing a relative translation of the first surface portion with respect to the fixing element.

The adjusting mechanism provides an adaptation of the relative positioning of the display with respect to the eye of the user by modifying (adjusting) the angular positioning of the display body around his rotational axis when the head-mountable component is positioned in front of the face of the user, taking into account the peculiarity of the user, notably his facial features and/or the way to positioning the head-mountable element.

In case of a head-mountable component being an airtight mask destined to be pushed against the face of the user, the adjusting mechanism also provides an adjustment of the pressure carried out by the first surface on the forehead when the airtight mask is worn by the user.

Moreover, the adjusting mechanism provides an easy sharing of the same displaying device within a plurality of users, as permitting to adapt it according to the peculiarity of each of these users.

In one embodiment, the adjusting mechanism is configured to indicate a plurality of discrete positions along the translation axis. This embodiment provides a more rapid and easy sharing of the same displaying device within a plurality of users. In fact, each user can simply translate the displaying body to one of such positions that has been previously identified (notably during a dead time or a system setting up) as providing them a desired positioning of the camera and/or a desired comfort.

In one embodiment, the displaying device is detachable from the fixing element. Alternatively or complementarily, the thermal camera is detachable from the head-mountable base.

These configurations provide a selective use of the same display body and/or the same thermal camera with a plurality of distinct head-mountable elements and/or head covering, each being (pre-) equipped with a fixing element and/or a head-mountable base of the augmented vision system.

In one embodiment, the augmented vision system comprises a camera adjusting mechanism for adjusting a sensing orientation of the thermal camera with respect to the head-mountable base. This embodiment provides the user to correlate the displayed image with viewed objects in field-of-view, without to have to remove of the mask.

BRIEF DESCRIPTION OF THE DRAWINGS

The invention will be better understood with the aid of the description of an embodiment given by way of example and illustrated by the figures, in which:

FIGS. 5a-d show steps of a coupling of the thermal sensing device of FIG. 1 on an helmet;

DETAILED DESCRIPTION OF POSSIBLE EMBODIMENTS OF THE INVENTION

Figure 1:
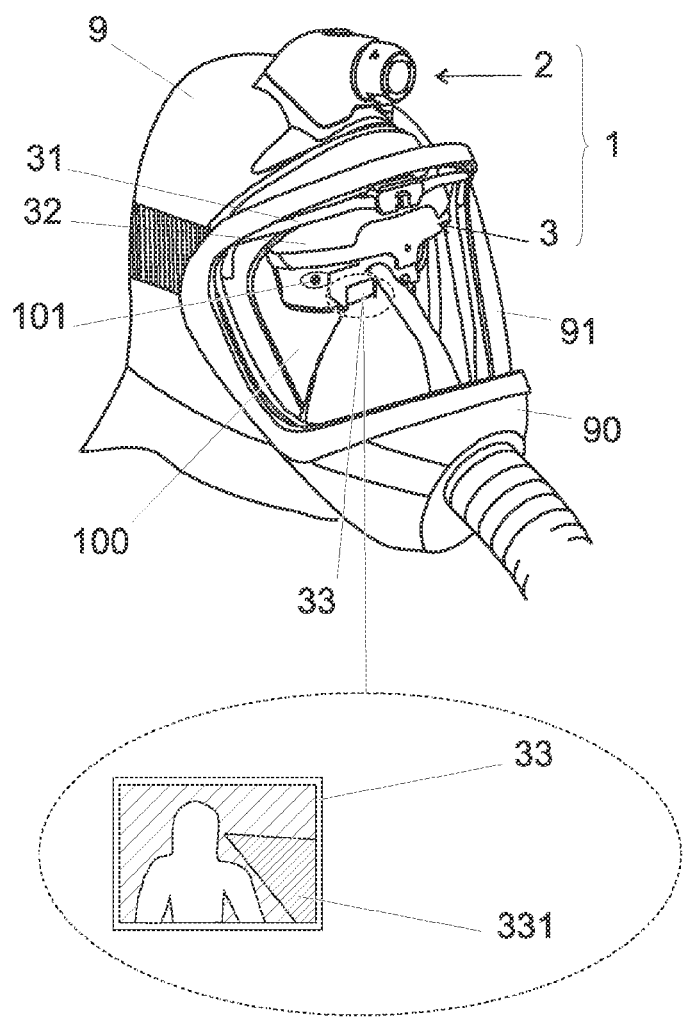
FIG. 1 shows a view of an embodiment of an augmented vision system coupled to a protecting helmet with a mask worn by a user, according to the invention.
Figure 2:
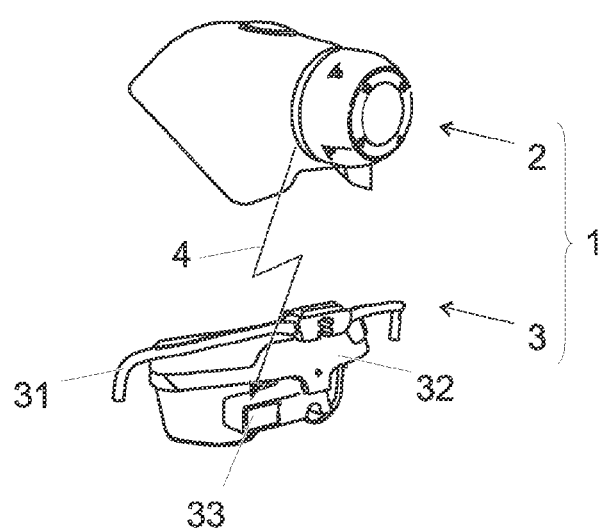
FIG. 2 shows a view of the thermal sensing device and the displaying device of the augmented vision system of FIG. 1.

FIGS. 1 and 2 show an exemplary embodiment of an augmented vision (AV) system 1 for providing a user with thermal data and/or images about elements of a physical, real world environment. The user can be a specialist operating in difficult and extreme environments, such as a firefighter, a solder, a policeman/woman and a rescuer, up to a driver, a pilot. The user can be an ordinary person, such a sportsman/woman, a cyclist and a walker, recreationally acting and/or moving in a poor visibility environment, notably in raison of particular climatic events, weathers (e.g. fog), or darkness.

The AV systems 1 is advantageously configured to provide a series of thermal data and/or thermal images 331, by means of a thermal sensing device configured to sense a temperature of an element (i.e. a degree or an intensity of heat present in said element) of a physical, real world environment where the user is operating.

Advantageously, the thermal sensing device comprises a thermal camera 221 sensing a grid of temperatures of objects within his field-of-view (according to a sensing orientation 223) so as to deliver an image (i.e. a 2-dimensional array or grid representation) of sensed temperatures. Advantageously, the AV systems 1 can be configured to display an image where given sensed temperatures degree or intensities are represented by distinct colors or grey levels.

Preferably, the thermal camera 221 provides a series of images in a continuous way (e.g. at an image rate of at least 10 images/s, preferably of more than 30 images/s) for augmenting non-visible or less visible elements in the field of view of the user, for sake of efficiency and safety.

The augmented vision system 1 comprises a displaying device 3 destined to be mount on a head-mountable component 90, the head-mountable component being configured to be positioned in front of a face of a user 100.

The displaying device 3 comprises a display 33 configured to display a thermal data and/or a thermal image 331 provided by the thermal sensing device 2 (notably by the thermal camera 221 thereof).

Advantageously, the thermal sensing device 2 of the AV systems 1 is a head-mountable thermal sensing device. The thermal sensing device can be a standalone thermal sensing device that configured to be fixed directly to the head of the user e.g. by means of elastic bands or grids. Alternatively or complementarily, the thermal sensing device is configured to be fixed to (or it is part of) a head covering, generally a protective head covering 9, as the exemplary embodiment of FIG. 1.

The thermal sensing device, when coupled to the head of the user, permits not only hands-free operations but also to sense temperatures of objects along a sensing orientation 223 following the orientation of the face of the user.

Preferably, the thermal sensing device 2 is configured to provide thermal data and/or thermal images to the display 33 by means of a wireless link 4.

In the exemplary embodiment of FIG. 1, the head-mountable component is an airtight mask 90 coupled to a protective helmet 9 worn by a user 100. The head-mountable component can be any component configured, destined or suitable to be positioned in front of a face of a user, e.g. for sake of security, comfort, sport, and/or of entertainment. The head-mountable component can be configured to be positioned in front of the face of the user with or without a direct contact with a portion of the face. The head-mountable component can be configured, destined or suitable to enter in contact with a portion of the face and/or the head of the user. The head-mountable component can thus be pushed against and/or posed by gravity on a portion of the face of the user, such as an eyewear and a mask. Alternatively, the head-mountable component can be configured, destined or suitable to be coupled to the head of the user (directly or through a head covering) so as to be retained in front of the face of the user in a contactless way, such a face shield or a visor of a head covering.

The displaying device 3 comprises a fixing element 31 for coupling the displaying device 3 to the head-mountable component 90, as illustrated in FIGS. 1 and 3a-e. The fixing element 31 is advantageously configured to be removably attachable to the head-mountable component 90, preferably without tools. The removably fixing element permits a complete removal of the displaying device 3 from the head-mountable component for sake of maintenances and/or reparation. The removably fixing element permits, in particular, a washing and/or a sterilization of the head-mountable component alone by means of fluids and/or by heating process potentially damaging components of the displaying device 3.

The displaying device 3 also comprises a display body 32 supporting a display 33 configured to display thermal data and/or images 331 provided by the thermal sensing device 2. The display body 32 is coupled to the fixing element 31 by means of a pivoting link 321, 322, 323 providing a rotation of the display body with respect to the fixing element around a rotational axis 38. Advantageously, the pivoting link provides a free rotation of the display body of an angle up to 45° (preferably within a range from 5° to 15°) round the rotational axis 38.

The pivoting link can be done by means of (relies on) magnets, plastic clips or other mounting/dismounting mechanism, with the purpose of providing a quick assembly while maintaining part or all of the rotational and adjustment components.

The display body comprises a surface portion 325 configured to enter in contact with a forehead of a user, when the head-mountable component 90 is positioned in front of the face of the user. The display body is then configured to impose a rotation of the display body 32 to a predefined angular positioning 381 around the rotational axis 38 with respect to the fixing element, when the surface portion 325 enters in contact with the forehead of the user.

This rotation to the predefined angular position provides a rapid and repeatable positioning of the display 33 with respect to the eye 101 of the user, using the forehead of the user as a spatial reference.

Preferably, the rotational axis 38 is substantially parallel to an imaginary line passing through the eyes 101 of the user (e.g. +/−10°), when said head-mountable component 90 is positioned in front of the face of the user.

The illustrated display body is advantageously configured to rotate 382 the display body around the same rotational axis 38 so as to push the first surface portion 325 against the forehead of the user, when the head-mountable component is positioned in the face of the user. This rotation 382 operates against the rotation 383 produced by the contact between the display body and the forehead of the user. This leads to a retention of the display body at the predefined angular positioning 381, notably in case of accelerations and/or vibrations affecting the head-mountable component (cf. FIG. 3e)

The counter-rotation 382 can be provided by an elastic force operating between the fixing element and the display body and/or by gravity, i.e. by means of particular spatial repartitions of masses within the display body with respect to the pivoting link 321, 322, 323.

FIGS. 3a-e and FIG. 7 show an advantageously embodiment of the displaying device 3 having a display body being removably coupled with the fixing element. This embodiment permits to individually assign a display body to each specialist of a team while providing to the team a limited number of security helmets.

Advantageously, the displaying device 3 also comprises an adjusting mechanism 311, 321 providing a relative translation of said first surface portion 325 with respect to the fixing element 31.

The adjusting mechanism of the FIGS. 3a-e comprises a slide link 311,321 providing a relative translation of the display body 32 with respect to the fixing element 31 along a translation axis 39. The translation axis 38 is perpendicular to the rotational axis 38 of the display body 32.

The adjusting mechanism provides an adaptation of the relative positioning of the display with respect to the eye of the user by modifying (adjusting) the angular positioning of the display body around his rotational axis This permits to take into account the peculiarity of the user, notably his facial features and/or the way to positioning the head-mountable element.

The slide link 311,321 can be configured to indicate a plurality of discrete positions along the translation axis 39 so as to rapidly provide a repeatable positioning the display body 32 along the translation axis 39. Preferably, the slide link 311,321 is also configured to retain the display body 32 in one of said plurality of discrete positions, e.g. by means of cooperating elements.

Figure 3A:
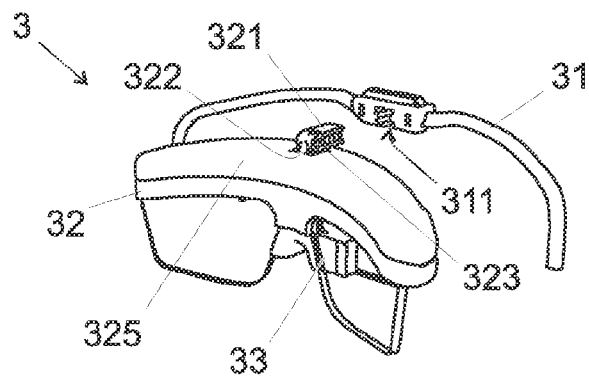
FIGS. 3a-e show steps of a coupling of the display body with the fixing element of the displaying device of FIG. 1.

As illustrated if FIG. 3a, the sliding guide 311 and of the slide 321 of the slide link can be provided through cooperating protuberances and recesses configured to generate a retaining force when the display body 32 is positioned at one of these discrete positions along the translation axis 39.

The magnitude of the force retaining the display body at the desired position is preferably within a range from 5 N to 50 N (i.e. $m \cdot kg \cdot s^2$), preferably within a range from 10 N to 30 N. These magnitudes permit the user to insert and to move the display body 32 from one to another of these discrete positions along the translation axis 39 in response of a force applied by fingers of the user, i.e. without the use of tool.

The sliding guide 311 provides thus a rapid and easy coupling of the display body with the fixing element of the displaying device, as illustrated in FIGS. 3a-e.

Figure 3B:
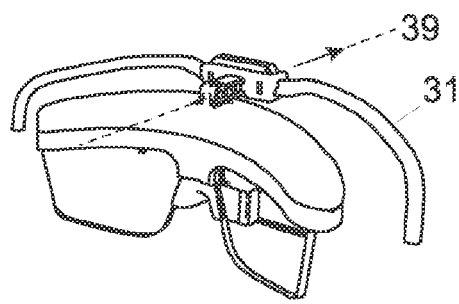
Figure 3C:
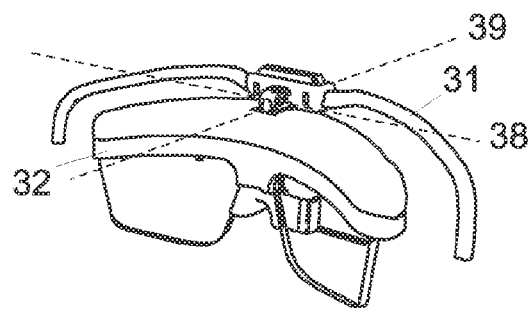

The coupling of the display body with the fixing element of the displaying device comprises a step of inserting the slide 312 within the sliding guide 311 of the displaying device 3 (FIGS. 3a-3b) up to the display body is positioned at the desired position along the translational axis 39 (FIG. 3c). Advantageously, the desired position can be determined during a preliminary wearing procedure and/or validated by prior uses of the augmented vision system 1, enabling a more rapid coupling procedure.

Figure 3D:
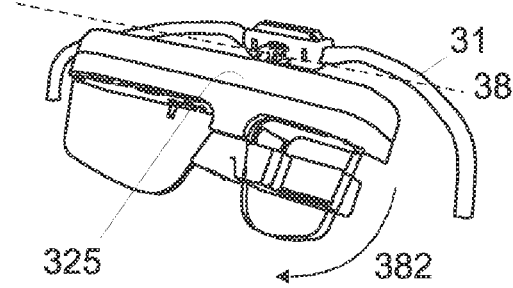

As the display device 3 is configured to rotate the display body 32 with respect to the fixing element 31 by gravity and/or by an elastic element, once the display body 32 is coupled to the fixing element 31, the display body tends to rotate with respect to the fixing element 31 so as to move the first surface away from the fixing element, as schematically illustrated by the rotation 382 in FIG. 3d.

Figure 3E:
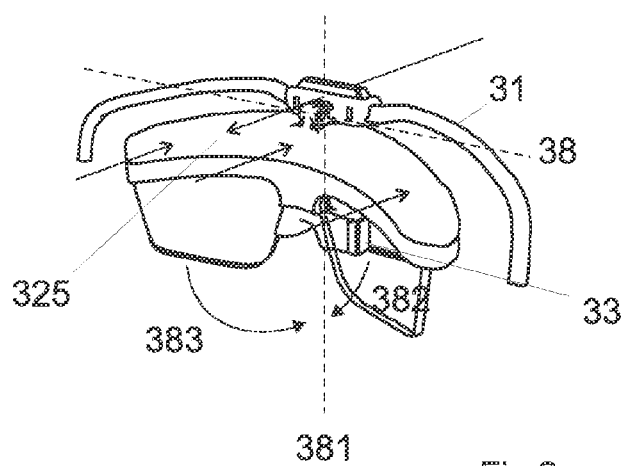

A positioning the display device in front of the face 102 of the user leads thus to a rotation of the display body around a rotational axis 38 up to the desired angular position 381 with respect to the fixing element 31, as schematically illustrated by FIG. 3e.

The use of the forehead of the user as a facial reference point also provides a better comfortability of the displaying device 3 when used in combination with an air-tight mask 90 being strongly pushed against the face, as illustrated in FIGS. 4a-d. In fact, with respect to other facial regions generally used as contact surfaces, e.g. the nose and of the eye's region, the larger surface provided by the forehead as well as his lack of soft tissues and cartilages provide a better repartitions of pressure and smaller sensitivities against prolonged pressures.

The display device 3 can comprise a support 328 for receiving user's lens 329, such as corrective lens and anti-fatigue lenses. Advantageously, the support 328 is also configured to support the display 33.

The display device can comprises an electronic circuit 327, notably for (wirelessly) receiving images from the thermal sensing device, processing these received images in particular for highlighting particular heat/cold element as well as to process images according to user's preferences and/or configurations, and to provide processed images to the display 33.

An exemplary method for coupling the augmented vision system 1 to a head covering is illustrated in figure FIGS. 5a-d.

Figure 4A:
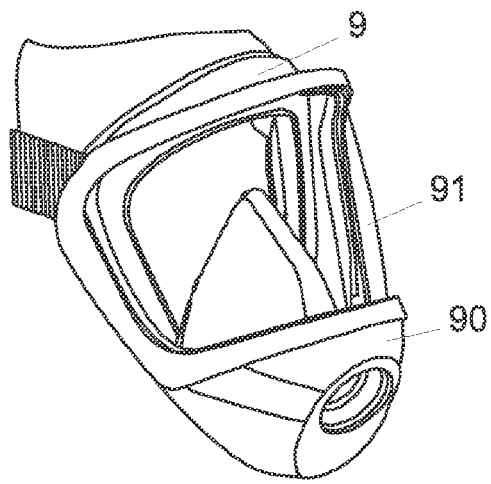
FIGS. 4a-d show steps of an installation procedure of the displaying device with the mask of FIG. 1.
Figure 4B:
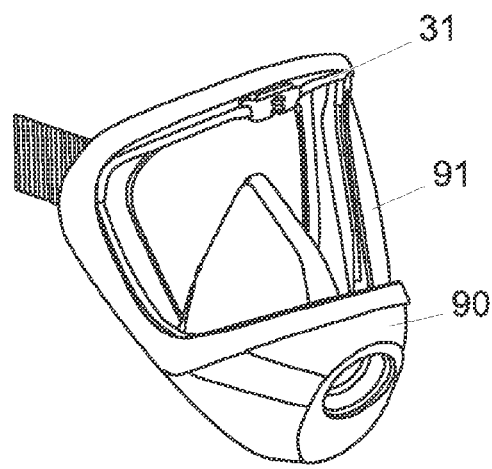
Figure 4C:
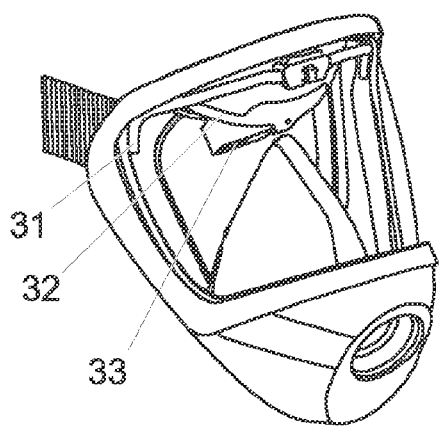

The initial step is to prepare the head-mountable component, i.e. the air-tight mask 90. This step comprises removably fastening the fixing element 31 to the air-tight mask 90 (FIG. 4b). Then, the display body 32 is rotatably coupled to the fixing element 31 (FIG. 4c). Notably, this step comprises steps of inserting the slide 312 within the sliding guide 311 up to the display body 32 is relatively positioned at the desired position along the translational axis 39 with respect to the fixing element (FIG. 3a-c).

Once the air-tight mask 90 is pushed against the face of the user, the first surface portion 325 will enter in contact to the forehead of the user leading to a rotation of the display body 32 to a predefined angular positioning 381 around the rotational axis. As previously described, a retention of the predefined angular positioning 381 can be provided by an elastic force operating between the fixing element and the display body and/or by gravity, so as to avoid rotational movements of the display body in response of accelerations and/or vibrations affecting the head-mountable component.

Figure 4D:
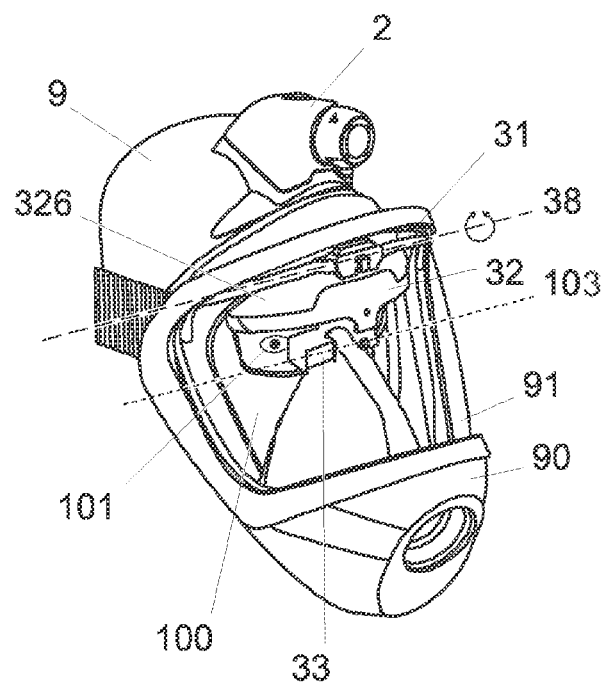

Alternatively or complementarily, the display body 32 can comprise a second surface portion 326 configured to enter in contact with a portion of the fixing element 31 and/or of the head-mountable component 90, when the head-mountable component 90 is positioned in front of the face of the user, as illustrated in exemplary embodiment of FIG. 4d. Advantageously, the second surface 326 is (substantially) located at an opposite side with respect to the first surface 325 so as to generate a counter-force permitting to retain the body display at the predefined angular position, when the mask is pressed against the face of the user.

Advantageously, the display body 32 can also comprise a resilient portion operating between the first surface portion 325 and the second surface 326 for resilient adapting a distance between them, notably the shortest distance between these surfaces so as to reduce the pressure carried out by the display body to the forehead of the user.

This permits a comfortable use of the AV systems 1 with airtight masks being strongly pushed against the face of the user for providing airtight function.

The adjusting mechanism 311, 321 permits not only to repetatably positioning the display at a desired position with respect to the eye of the user but also to adjust (notably reduce) the pressure transmitted to the forehead through the fixing element and/or this second surface 326.

Advantageously, the display 33 is pivotally mounted on the display body 32 (notably on the support 328 thereof) so as to provide an adjustment of an angular position of the display's surface around a rotational axis, this rotational axis being parallel to the rotational axis 38 of the displaying device 3. This arrangement permits the user to adapt the relative inclination of the display's surface (when operationally positioned in front of the face) with respect to his eye for optimizing the visibility of displayed images.

The air-tight mask 90 can be a standalone mask that can be configured to be fixed directly to the head of the user, e.g. by means of elastic bands or grids. Alternatively or complementarily, the air-tight mask 90 can be configured to be fixable to (or being a part of) a head covering, generally a protective head covering 9, as the exemplary embodiment of FIGS. 4a-d.

The method for coupling the augmented vision system 1 can comprise a step of fixing the thermal sensing device 2 on a head covering, notably on the same protective helmet 9 where the air-tight mask is coupled (cf. FIG. 4d).

The fixing of the thermal sensing device 2 comprises the steps of:

fastening the thermal sensing device 2, in particular the thermal camera 221, to the head covering 9; and when the head-mountable component 90 is positioned in the front of the face 102 and the head covering worn by the user, adjusting the sensing orientation 223 of the thermal camera, notably of the thermal camera 221, with respect to the head covering 9.

Figure 6:
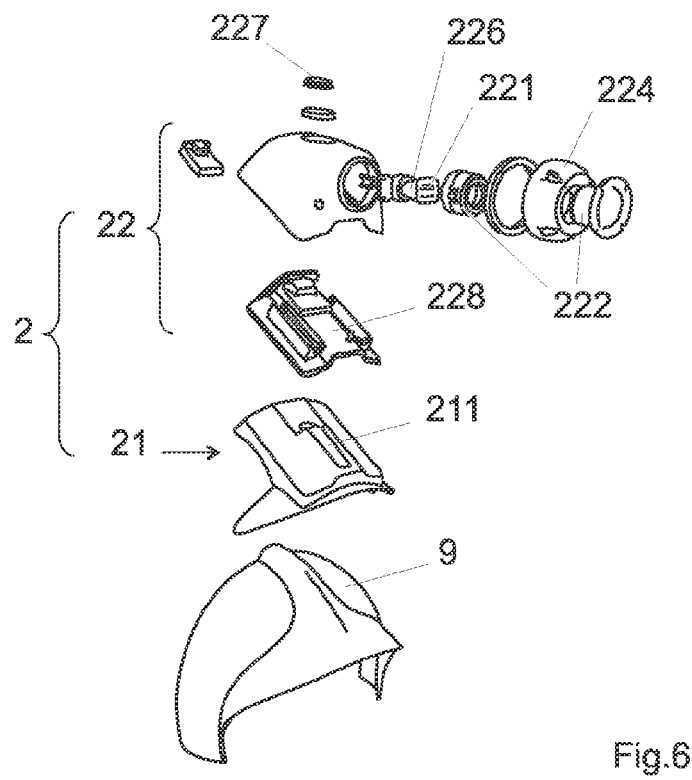
FIG. 6 shows a view of components of the thermal sensing device of FIG. 1.
Figure 7:
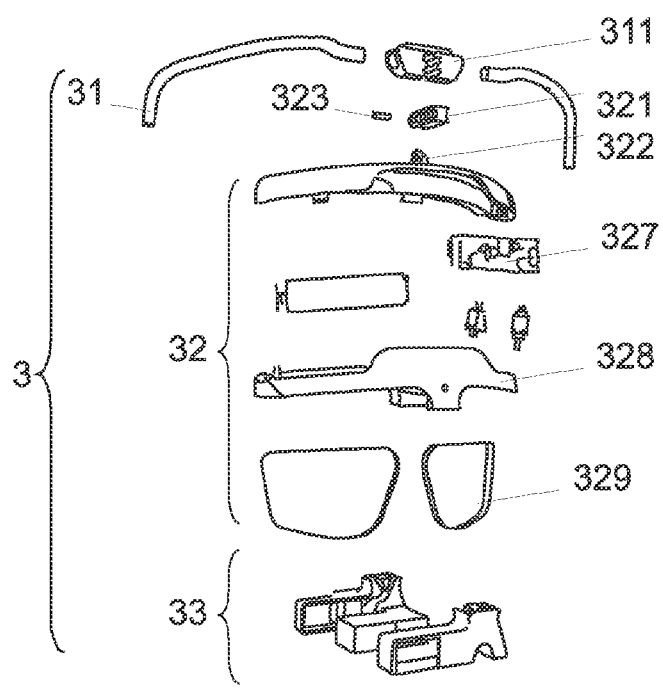
FIG. 7 shows a view of components of the displaying device of FIG. 1.

FIG. 5a-d show an exemplary method for coupling the thermal sensing device 2 illustrated in FIG. 6 on a head covering, notably on the security helmet 9 of FIG. 1.

The illustrated thermal sensing device 2 comprises:

a head-mountable base 21;

a sensing body 22 coupled to the base and comprising the thermal camera 221; and a camera adjusting mechanism 23 for adjusting an orientation of the sensing orientation 223 of the thermal camera 221 with respect to the head-mountable base 21, e.g. with respect to an orientation 213 thereof.

The sensing body 22 can comprise an electronic circuit for controlling the acquisition of images and for transmitting acquired images to the display 33. The sensing body 22 can also comprise a power on/off button 227 for powering said electronic circuit.

Once the head-mountable base 21 is permanently fixed on the helmet, preferably either on the top or on a side of the helmet, the sensing body can be fastened to the head-mountable base 21 (FIG. 5a). A removably fastening of the sensing body permits a management of AV systems within a team of specialists, e.g. by individually assigning a series of sensing bodies to specialists of the team, while sharing a reduced number of security helmets.

In the illustrated embodiment, the sensing body 22 is removably coupled to the head-mountable base 21 by sliding a slide element 228 of the sensing body into a sliding recess 211 of the head-mountable base 21 up to reach an stop-end-212 thereof (FIG. 5b).

When the thermal sensing device 2 is mounted on the head covering, the user can adjust the sensing orientation 223 by means of the camera adjusting mechanism so as to align and/or correlate sensed objects (e.g. the field-of-view of the thermal camera) with the field-of-view of the user.

The camera adjusting mechanism is configured to provide the user to adapt the sensing orientation 223 of the thermal camera 221 with respect to the head-mountable base 21, so as to permit the user to spatially correlate displayed objects with objects within the field of view of the user. The camera adjusting mechanism can thus be configured to provide indexed positions with respect to the head-mountable base 21, each position providing a distinct sensing orientation 223 of the thermal camera 221 along to one or more (notably two perpendicular) directions.

In the illustrated exemplary embodiments, the head-mountable base 21 is fixed to the thermal sensing device 2 so as the sensing orientation 223 of the thermal sensing device 2 is within an imaginary plan 225 being substantially perpendicular to the imaginary line 103 passing through the eyes 101 of the user (e.g. +/−10°), when the head covering is worn by the user (cf. FIG. 5c).

This fixing permits to sense objects being in front of the face of the user when it wears the head covering. The camera adjusting mechanism of this embodiment is then configured to provide the user to adjust an angular positioning (a) of the sensing orientation 223 with respect to the head-mountable base 21, this uniquely within this imaginary plan 225. The camera adjusting mechanism can be configured to provide the user to adjust the angular positioning (a) within a range b of at least 10°. Preferably, the camera adjusting mechanism can be configured to provide an angular adjusting up to −10°/+20° with respect to a default angular position. In extreme case, the camera adjusting mechanism can be configured to provide an angular adjusting up to −40°/+60° with respect to a default angular position.

Preferably, the camera adjusting mechanism is configured to provide the user to adjust the angular positioning (a) of the sensing orientation 223 around a rotating axis 24 being substantially parallel (e.g. +/−10°) to the imaginary line passing through the eyes 101 when the head covering is worn by the user.

These arrangements reduce the time-to-enabling by limiting the adjustment to a single degree of freedom.

Moreover, the camera adjusting mechanism also comprises an adjusting element, notably an adjusting ring 224, being accessible by fingers of the user for adjusting the angular position. This provides the user to fine tuning the angular positioning of the sensing orientation 223 (e.g. the field-of-view of the thermal camera) while seeing the outcome on the display 33, as illustrated in FIG. 5d.

In the embodiment of FIGS. 4 and 5, the displaying device is removably fixable to a protective visor 91 of a mask 90 by means of a U-shaped, resilient fixing element 31. The fixing element is entirely or partially made of resilient material and configured to provide an elastic force operating on one or more distinct portions of the head-mountable component 90 so as to removably retain the fixing element 31 to the head-mountable component 90.

Such as removable fixing of the displaying device provides a fixing on standard and customizable head-mountable component, without modifying and/or damaging a structure thereof. In particular, such removable fixing does not compromise the functionality and the technical features of the head-mountable component, notably in case of a protective head-mountable component.

FIGS. 8-11 show other particular embodiments of the displaying devices, notably of the manner the displaying device is fixable to the head-mountable component (e.g. an eyewear 93) by means of the fixing element 31a-e thereof.

Figure 8:
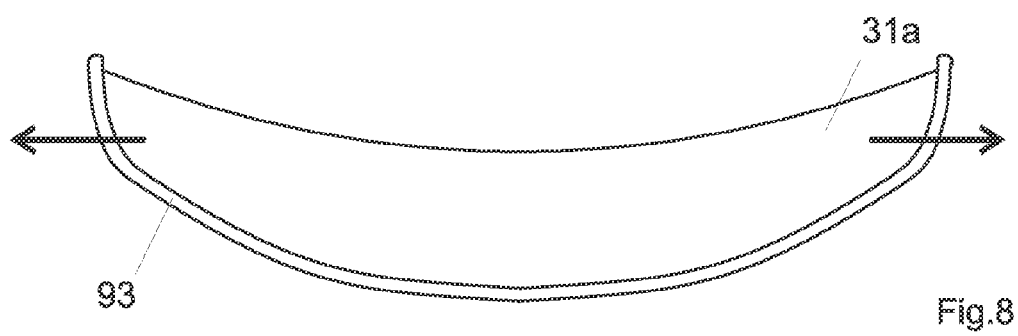
FIGS. 8-11 show others embodiment of the displaying device, according to the invention.

The embodiment of FIG. 8, the displaying devices is removably fixed into an inside portion of the head-mountable component 93 by means of a fixing element 31a. The fixing element 31a is entirely or partially made of resilient material and configured to be compressible so as to geometrically fit, side-to-side, the inside contour of the head-mountable component 93. The resilient material provides thus a retaining elastic force operating on the inside surface of the head-mountable component 90. Preferably, the fixing element 31a can be coated with a non-slipping layer so as to promote adherence.

Figure 9:

The embodiment of FIG. 9, the displaying devices is removably fixed on an upper portion of the head-mountable component 93 by means of a fixing element 31b. The fixing element 31b, preferably entirely or partially made of resilient material, comprises a U-shaped portion destined to receive (notably to envelop) the upper contour of the head-mountable component 93.

Figure 10:
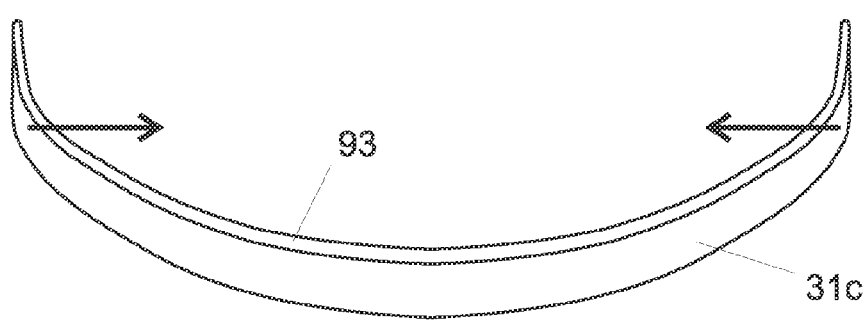

The embodiment of FIG. 10, the displaying devices is removably fixed into an outside portion of the head-mountable component 93 by means of a fixing element 31c. The fixing element 31c is entirely or partially made of resilient material and configured to be deformed so as to geometrically fit, side-to-side, the outside contour of the head-mountable component 93. The resilient material provides thus a retaining elastic force operating on the outside surface of the head-mountable component 90, preferably the fixing element 31c can be coated with a non-slipping layer.

Figure 11:
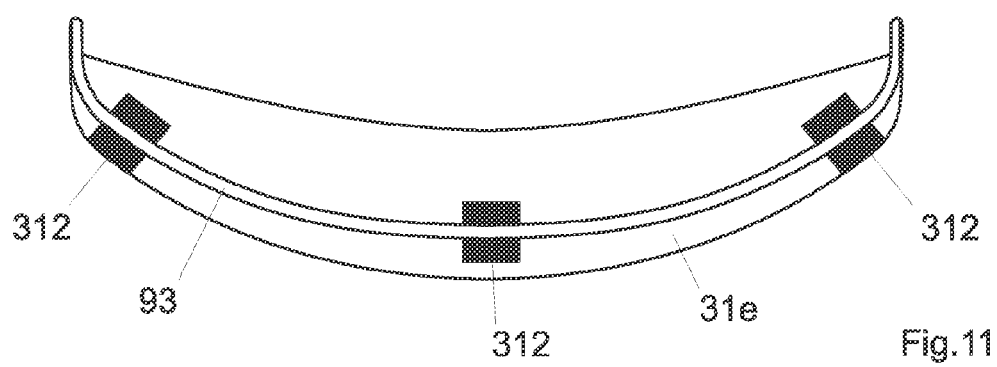

The embodiment of FIG. 11, the displaying devices is removably fixed to the head-mountable component 93 by means of a two-part fixing element $31_d$ destined to be place on opposite sides of the head-mountable component 93. The first and the second parts of the fixing element 31e are joinable together, for example, by means of magnetics elements 93.

Alternatively, the displaying device can be fixed to the head-mountable component by means of one or more permanent fixings, such as screws, nails, spikes, rivets, glue, and/or adhesive.

NUMBERED ITEMS

1 First vegetable organism
2 Thermal sensing device
21 Base
211 Sliding recess
212 Stop
213 Orientation of the base
22 Sensing body
221 Thermal camera
222 Optic lens or assembly
223 Sensing orientation
224 Adjusting ring
225 Imaginary plan
226 Electronic circuit
227 On/off button
228 Slide
24 Rotating axis
3 Displaying device
31, 31a-e Fixing mechanism
311 Sliding guide
312 Magnet
32 Display body
321 Slide
322 Coupling element
323 Shaft
325 Surface for forehead
326 Surface for Head-mountable component
327 Electronic circuit
328 Lens support
329 Lens/lenses
33 Display
331 Thermal image
38 Rotational axis
380 Angular positioning
381 Predefined angular positioning
382 Counter-rotation
383 Rotation
39 Translation axis
4 Wireless channel
9 Protective head covering
90 Protective mask
91 Protective visor
93 Eyewear
100 User
101 Eye
102 Face
103 Imaginary line
a Angle between the sensing orientation and the base
b Adjusting angles range

The invention claimed is:

1. An augmented vision system (1) comprising:
   a displaying device (3) comprising:
      a fixing element (31) for coupling the displaying device (3) to a head-mountable component (90) configured to be positioned in front of a face (102) of a user (100), and
      a display body (32) coupled to said fixing element (31) by a pivoting link (321, 322, 323);
      wherein the display body (32) comprises a display (33) configured to display a thermal data and/or a thermal image (331) provided by a thermal sensing device (2), and a first surface portion (325) configured to enter in contact with a forehead of the user (100) when said head-mountable component (90) is positioned in front of the face (102) of the user (100); and
      wherein the pivoting link (321, 322, 323) provides rotation of the display body (32), such that the display body (32) can rotate with respect to the fixing element (31) around a rotational axis (38) in response to the forehead of the user entering into contact with the first surface portion (325) when the fixing element (31) is fastened to the head-mountable component (90).

2. The augmented vision system according to claim 1, wherein the displaying device (3) comprises an adjusting mechanism (311, 321) providing a relative translation of said first surface portion (325) with respect to the fixing element (31).

3. The augmented vision system according to claim 2, wherein said adjusting mechanism comprises a slide link (311, 321) providing a relative translation of the display body (32) with respect to the fixing element (31) along a translation axis (39) perpendicular to the rotational axis (38).

4. The augmented vision system according to claim 3, wherein the slide link (311, 321) is configured to indicate a plurality of discrete positions along the translation axis (39), and wherein the slide link (311, 321) is configured to retain the display body (32) when positioned at one of said plurality of discrete positions with respect to the fixing element (31).

5. The augmented vision system according to claim 3, wherein the displaying device (32) is detachable from the fixing element (31) by means of the slide link (311, 321).

6. The augmented vision system according to claim 1, wherein the displaying device (3) is configured to rotate the display body (32) for pushing the first surface portion (325) against the forehead of the user (100) when the head-mountable component (90) is positioned in front of the face (102) of the user (100).

7. The augmented vision system according to claim 6, wherein the display body (32) comprises a second surface portion (326) configured to enter in contact with a portion of the fixing element (31) and/or of the head-mountable component (90) when the head-mountable component (90) is positioned in front of the face (102) of the user (100), and wherein the display body (32) comprises a resilient portion operating between the first surface portion (325) and the second surface portion (326).

8. The augmented vision system according to claim 1, wherein the fixing element (31) is removably fastened to the head-mountable component (90).

9. The augmented vision system according to claim 8, wherein the fixing element comprises at least a resilient portion configured to provide an elastic force operating on one or more distinct portions of the head-mountable component (90) so as to removably retain the fixing element (31) to the head-mountable component (90).

10. The augmented vision system according to claim 1, wherein the display is a see-through-display (33).

11. The augmented vision system according to claim 1, wherein the thermal sensing device (2) is a head-mountable thermal sensing device (2), and wherein the thermal sensing device (2) is configured to provide thermal data and/or thermal images to the display (33) by means of a wireless link (4).

12. The augmented vision system according to claim 1, wherein the thermal sensing device (2) comprises:
   a head-mountable base (21);
   a sensing body (22) coupled to the base (21) and comprising a thermal camera (221) for sensing temperatures of an object along a sensing orientation (223); and a camera adjusting mechanism for adjusting an angular positioning of the sensing orientation (223) of the thermal camera (221) with respect to the head-mountable base (21) around a rotating axis (24).

13. The augmented vision system according to claim 12, wherein the thermal camera (22) is detachably coupled to the head-mountable base (21).

14. The augmented vision system according to claim 1, wherein the head-mountable thermal sensing device (2) is fastened to a head-covering (9) by means of the head-mountable base (21).

15. The augmented vision system according to claim 14, wherein the head-mountable component (90) is coupled with the head-covering (9) by means of a resilient element so as to provide an elastic force pushing the head-mountable component (90) against the face (102) of the user (100).

16. The augmented vision system according to claim 14, wherein the head covering (9) is a helmet.

17. The augmented vision system according to claim 14, wherein the head-mountable component (90) is an eyewear, a mask, a face shield or a visor (90) of the head covering (9).

18. The augmented vision system according to claim 1, wherein the display body (32) is configured to rotate to a predefined angular positioning (381) around the rotational axis (38).

19. A method for wearing an augmented vision system, the method comprising steps of:
fastening a fixing element (31) of a displaying device (3) to a head-mountable component (90) configured to be positioned in front of a face (102) of a user (100);
rotatably coupling a display body (32) of the displaying device (3) to said fixing element (31), wherein the display body (32) comprises a display (33) configured to display a thermal data and/or a thermal image (331) provided by a thermal sensing device (2), and a first surface portion (325) configured to enter in contact with a forehead of the user (100) when said head-mountable component (90) is positioned in front of the face (102) of the user (100); and
rotating the display body (32) around a rotational axis (38) to a given angular position with respect to the fixing element (31) in response to the first surface portion (325) of the display body (32) entering into contact with the forehead of the user (100) when the head-mountable component (90) is positioned in front of the face (102) of the user (100).

20. The method according to claim 19, wherein the step of coupling the display body (32) includes positioning the display body (32) with respect to the fixing element (31) along a translation axis (39) perpendicular to the rotational axis (38) of the display body (32).

21. The method according to claim 19, wherein the thermal sensing device (2) comprises a thermal camera (221), the method further comprising steps of:
fastening the thermal camera (221) to a head covering (9); and
when the head-mountable component (90) is positioned in the front of the face (102) of the user (100), adjusting a sensing orientation (223) of the thermal camera (221) with respect to the head covering (9).

\* \* \* \* \*